(12) United States Patent
Lacarnoy

(10) Patent No.: US 9,941,735 B2
(45) Date of Patent: Apr. 10, 2018

(54) CIRCUIT AND METHOD FOR PROVIDING AN UNINTERRUPTIBLE POWER SUPPLY

(71) Applicant: SCHNEIDER ELECTRIC IT CORPORATION, West Kingston, RI (US)

(72) Inventor: Alain Lacarnoy, Saint Nazaire les Eymes (FR)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 399 days.

(21) Appl. No.: 14/433,966

(22) PCT Filed: Oct. 11, 2012

(86) PCT No.: PCT/IB2012/002179
§ 371 (c)(1),
(2) Date: Apr. 7, 2015

(87) PCT Pub. No.: WO2014/057298
PCT Pub. Date: Apr. 17, 2014

(65) Prior Publication Data
US 2015/0270744 A1    Sep. 24, 2015

(51) Int. Cl.
*H02J 9/06*    (2006.01)
*H02J 7/00*    (2006.01)

(52) U.S. Cl.
CPC .............. *H02J 9/061* (2013.01); *H02J 7/007* (2013.01); *Y10T 307/625* (2015.04)

(58) Field of Classification Search
CPC ........ H02J 9/061; H02J 7/007; Y10T 307/625
USPC ...................................... 307/43–87
See application file for complete search history.

(56) References Cited

U.S. PATENT DOCUMENTS

| 6,169,669 B1 * | 1/2001 | Choudhury | ............. | H02J 9/062 307/66 |
| 6,204,574 B1 | 3/2001 | Chi | | |
| 6,977,448 B2 * | 12/2005 | Kanouda | ................. | H02J 9/061 307/52 |

(Continued)

OTHER PUBLICATIONS

G. Ledwich, "DC-DC Converter Basics," http://www.powerdesigners.com/InfoWeb/design_center/articles/DC-DC/converter.shtm; May 28, 2004, pp. 1-16.

(Continued)

*Primary Examiner* — Brandon S Cole
(74) *Attorney, Agent, or Firm* — Lando & Anastasi, LLP

(57) ABSTRACT

An uninterruptible power supply operates between a main supply input, a battery and a load, and comprises an input converter and an output converter. In a first mode of operation, AC mains power received at the supply input is converted by said input converter and output converter in series to provide an AC power supply to the load. In a second mode of operation, stored energy is released from the battery via the output converter to maintain the AC power supply to the load. A further converter can be used during the first mode of operation to charge the battery from a charging supply input. The charging current bypasses the input converter, allowing charging rate to be increased, without increasing a power rating of the input converter. The further converter may be bidirectional and be used also in the second mode.

18 Claims, 5 Drawing Sheets

(56) References Cited

U.S. PATENT DOCUMENTS

| | | | | |
|---|---|---|---|---|
| 7,053,502 B2* | 5/2006 | Aihara | H02J 9/061 | 307/46 |
| 7,245,469 B2* | 7/2007 | Nemoto | H02J 7/027 | 307/66 |
| 7,550,872 B2* | 6/2009 | Hoekstra | H02J 9/062 | 307/64 |
| 7,952,231 B1* | 5/2011 | Zansky | H02J 7/34 | 307/44 |
| 8,115,339 B2* | 2/2012 | Jung | H02J 9/062 | 307/64 |
| 2002/0071292 A1* | 6/2002 | Aihara | H02J 9/061 | 363/20 |
| 2005/0078494 A1* | 4/2005 | Aihara | H02J 9/061 | 363/37 |
| 2012/0019070 A1* | 1/2012 | Matsuoka | G06F 1/30 | 307/64 |
| 2013/0264865 A1* | 10/2013 | Sugeno | H02J 5/00 | 307/9.1 |
| 2015/0035359 A1* | 2/2015 | Chung | H02J 3/32 | 307/23 |
| 2016/0211700 A1* | 7/2016 | Zhang | H02J 9/06 | |

OTHER PUBLICATIONS

J. W. Kolar, M. Hartmann, T. Friedli, Three-Phase PFC Rectifier and AC-AC Converter Systems, Tutorial at the 26th Annual IEEE Applied Power Electronics Conference and Exposition (APEC 2011), Ft. Worth, TX, USA, Mar. 6-10, 2011.

Notification of Transmittal of the International Search Report and the Written Opinion of the International Searching Authority from corresponding PCT/IB2012/002179 dated Jun. 12, 2013.

* cited by examiner

CIRCUIT AND METHOD FOR PROVIDING AN UNINTERRUPTIBLE POWER SUPPLY

This application is a U.S. National Stage Application under 35 U.S.C. § 371 from International Application No. PCT/IB2012/002179, filed Oct. 11, 2012, which is hereby incorporated by reference in its entirety for all purposes.

FIELD OF THE INVENTION

The present invention relates to an improved architecture for uninterruptible power supplies (UPS).

BACKGROUND OF THE INVENTION

An uninterruptible power supply (UPS) may be used to provide emergency power in situations where the main power supply fails or performs in an unusual manner. A UPS is designed to switch over as quickly as possible, given limitations of the batteries used and the circuitry of the UPS. A UPS can be used to deal with a number of unusual events occurring at the main power supply, such as: power failure; surge; sag; spikes; noise; frequency instability; harmonic distortion; etc.

A UPS can be used to protect any type of equipment, however, generally a UPS is most often found in computers, data centers, telecommunication systems, and any other electrical equipment for which a power supply failure could cause serious consequences such as damage to a person or to a business interest.

A UPS can take many different forms and relate to various different technologies. The most common general categories of UPS are online, line interactive, and standby. Each of these is well-known in the art as are the other alternatives such as hybrid topologies and ferro-resonant technologies.

An essential element of a UPS is a battery which provides the power after switch over has occurred. The capacity of the battery determines the period of "autonomy" which the UPS can provide for a load, in the absence of a mains supply. Batteries may be required for example to provide a nominal power output over a period of, say, 8 hours. Provided the external (mains) supply is restored within that period, power to the load is uninterrupted. However, once the power is restored, the battery will be in a (partially) discharged state. Consequently, until the battery is recharged to a full state, the autonomy offered by the UPS is reduced below the 8 hour period. A second incident interrupting the main supply brings much greater risk to the collected loads.

Two factors that limit the speed of recovery of charge, and hence the recovery of autonomy, are the battery technology itself and the rate at which charging current can be supplied by the UPS to recharge the battery. The term "battery" as used herein should be understood to encompass any arrangement in which energy can be stored while being received and released in the form of electricity. Typically, lead acid batteries are used. Traditional lead acid batteries are limited to a slow charging rate, such that a fully discharged battery may take, for example, 10 hours to recharge. More modern battery technologies, for example lithium iron phosphate (LiFePO4) batteries, can be recharged much more quickly, offering the potential to reduce recovery times in UPS systems. However, to recharge the battery so quickly requires a proportionately higher charging current. Using current UPS architectures, to provide such a high charging current whilst simultaneously providing a conditioned supply to the load under normal, mains-powered operation, requires significantly increased power ratings in the converter circuits that are the key components of a UPS circuit.

To increase the rating of the circuits, for example to provide recharging of the battery at a rate equal to the maximum rate at which it can be discharged, an input converter of the UPS would require a doubled power rating. This has a disproportionate impact on cost of the circuitry, and discourages exploitation of the potential of these new battery types.

SUMMARY

It is an object of the invention to enable the provision of a UPS system that can exploit the potential of new battery technologies, without a disproportionate increase in the cost of the UPS circuitry.

The invention in a first aspect provides an uninterruptible power supply circuit having a main supply input, connections for a battery, and a supply output, the circuit comprising an input converter and an output converter, said input converter being connected between said supply input and said output converter, said output converter being connected between an output of said input converter and said supply output, the circuit being operable in (i) a normal operation mode in which power is received at said supply input and converted by said input converter and output converter in series to provide an output power supply via said supply output to a load, and (ii) a discharge mode wherein stored energy from said battery is released to said load via the output converter to maintain said output power supply to the load in the absence of power at said supply input, and wherein the circuit includes a further converter operable to provide a charging current supply to said battery from a charging supply input, which may be the same as the main supply input or different, said charging current bypassing said input converter.

Because the charging current bypasses the input converter, the charging rate can be increased, without increasing a power rating of the input converter. Where the main supply input and charging supply input are separate, the charging rate can be increased without increasing a power rating of the main supply input.

In some embodiments of the invention, the further converter is bidirectional and is used also in the second mode to release energy from the battery.

In some embodiments, a second further converter is provided between the battery connections and the output converter, said second further converter being operable in said discharge mode to transfer a further portion of said released energy from the battery directly to the output converter.

In some embodiments, the second further converter is operable in a high load mode to supply power to said output converter in parallel with power supplied by said input converter, such that power to the load can exceed a power rating of the input converter.

The invention further provides an uninterruptible power supply comprising at least one circuit according to the first aspect of the invention as set forth above, in combination with a battery connected to the battery connections of the circuit.

The invention further provides an electrical installation comprising an uninterruptible power supply as set forth in the preceding paragraph, connected by its main supply input and charging supply input to one or more power supplies, and connected by its supply output to a load.

The invention in a second aspect provides a method of providing an uninterruptible power supply between a main supply input, a battery and a load, the method comprising the steps:

(a) providing an input converter and an output converter, said input converter being connected between said supply input and said output converter, said output converter being connected between an output of said input converter and said load;

(b) in a first mode of operation in which power is received at said supply input, converting power by said input converter and output converter in series to provide an output power supply via said supply output to a load;

(b) in a second mode of operation in which power at said supply input is absent or unreliable, releasing stored energy from said battery via the output converter to maintain said output power supply to the load; and (c) using a further converter during said first mode of operation to provide a charging current supply to said battery from a charging supply input, which may be the same as the main supply input or different, said charging current bypassing said input converter.

These and other aspects and advantages of the invention will be apparent to the skilled reader from a consideration of the examples described below.

BRIEF DESCRIPTION OF THE DRAWINGS

Embodiments of the invention will now be described, by way of example only, with reference to the accompanying drawings in which.

DETAILED DESCRIPTION OF EXEMPLARY EMBODIMENTS

It is assumed in all of the present description that supply inputs are for connection to AC mains supplies, and that the output provides an AC supply to a connected load (not show). The first and second input supplies and the output supply need not be the same as one another in voltage, frequency, number of phases etc. For example, AC lines may commonly be three phase or single phase. If the application requires it, any of the input and/or output supplies could be DC.

Figure 1:
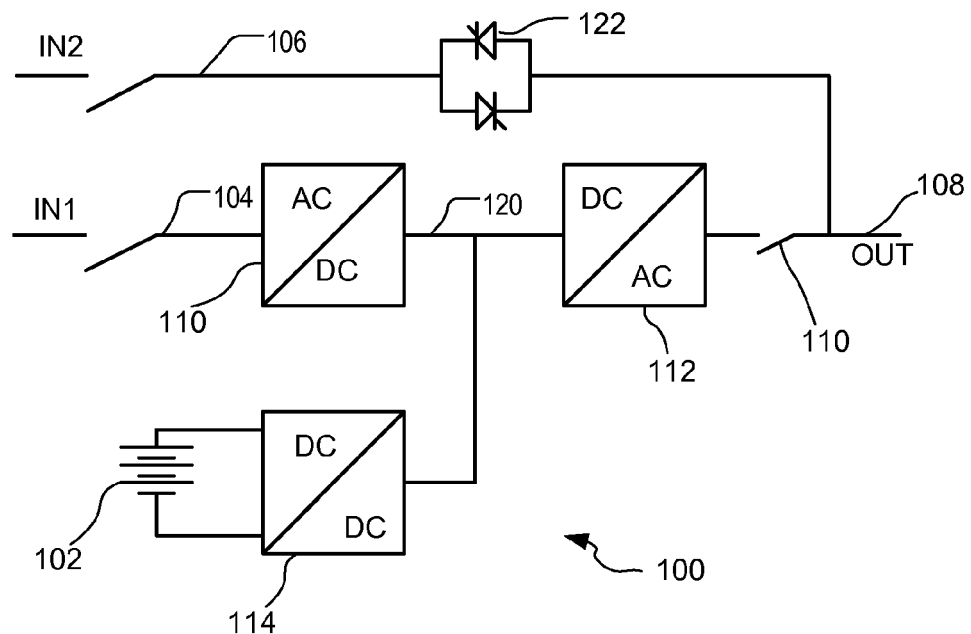
FIG. 1 is a schematic block diagram of a conventional uninterruptable power supply (UPS)

FIG. 1 shows the architecture of a conventional UPS 100, based on a battery 102. UPS 100 has first and second line inputs 104, 106 and line output 108. Three power converter circuits are provided: a power factor correction (PFC) AC-DC converter 110; a DC-AC converter (inverter) 112 and a DC-DC converter 114. AC-DC converter 110 is connected between first input 104 and an internal DC bus 120 of the UPS. DC-AC converter 112 is connected between DC bus 120 and output 108. Battery 102 is connected to DC bus 120 via DC-DC converter 114. Second supply input 106 is connectable to 108 via in interrupter 122. Depending on the type of each converter, it can increase a voltage (boost converter), decrease voltage (buck converter) or decrease and increase the voltage (buck-boost). Converters can also be unidirectional (power can only flow from an input to an output side of the converter) or bidirectional (power can flow in either direction, between two terminals which can function at different times as both input and output). In the conventional UPS architecture of FIG. 1, converters 110 is unidirectional, while DC-DC converter 104 and DC/AC converter 112 are bi-directional.

UPS 100 has 3 modes of operation: "normal", "discharge", "overload". A fourth mode "bypass" is enabled using interrupter 122. In "normal" operation, AC power is transferred from the first input 104 to a load connected to output 108 through AC-DC converter 110, DC bus 120 and DC-AC converter 112 in series. Converters 104 and 112 work together (under command of a controller, not shown) to condition the supply provided to the load via output 108, so that it remains within a desired specification, correcting variations in the quality of the supply at input 104 (over-voltage or under-voltage; noise spikes). The controller receives various current and voltage measurements from different parts of the circuit, in order to perform its function. The skilled reader is familiar with these requirements and they will not be described further herein.

During normal operation, if battery 102 is not fully charged, additional power is taken from DC bus 120 via DC-DC converter 114 to charge the battery. If a supply of suitable quality for the load is known to be available at second input 106, or if the other components of UPS 100 should fail, the bypass mode can be activated using interrupter 122. Various switches are provided as shown, for isolating different parts of the system from one another and from the input supply lines and output. In a system with reduced flexibility, the supplies 104, 106 may be the same in fact.

In a discharge mode, when power at input 104 is inadequate or absent, the operation of DC-DC converter 114 is reversed so the power is taken from battery 102 to the DC bus 120. This power is then converted to a suitable AC form via DC-AC converter 112 for supply to the load 108. In the event of unexpected power failure, the controller switches operation from normal to discharge mode quickly enough that the load does not experience any interruption in the supply.

"Overload" operation typically means only that the load is drawing greater than its nominal power rating. Converters 110, 112 are designed to handle the additional power for a certain period of time. The operation is generally no different than "normal" operation. One could supply additional power by discharging stored energy from the battery.

As will be well understood, the period for which the UPS can power a load in the absence of mains supply depends on the current (power) drawn by the load, and the capacity and charge state of battery 102. When battery 102 is fully charged, the UPS provides maximum "autonomy", meaning that the load can be powered in discharge mode for a maximum amount of time in the event of mains supply interruption. When normal operation is resumed, however, autonomy is limited because the battery 102 will be in a partially discharged state. The load is therefore more vulnerable to a further outage, until full charge can be restored to the battery. In the meantime, autonomy is compromised.

It is therefore desirable to minimize the delay for recharging the battery, after a period of discharge operation. Two factors that limit the speed of recovery of charge are the battery itself (which can only accept a certain rate of charge without damaging the battery) and the rate at which charging current can be drawn from DC bus 120 without affecting the condition of the supply to the load at output 108 and/or overloading input converter 110. Traditional lead acid batteries are limited to a charging rate of approximately 0.1 C, where C (in amperes) is the rated capacity of the battery, representing the current that a fully charged battery can sustain over a defined period of hours. In other words, if the lead acid battery is discharged at full rate C for an hour, the maximum rate of charge is such that it must take ten hours for the battery to recover to the charged state it was before the discharge. On the positive side, to provide such a charging current takes only about ten percent of the capacity of the input converter 110. More recently, battery technologies have become available permitting much greater rates of charge, and these are attractive to provide UPS systems with higher integrity, and particularly ones which will recover full autonomy much more quickly after a period of discharge. Examples of such batteries are lithium iron phosphate and lithium cobalt oxide (LiFePO4 and LiCoCO2). Some of these batteries can accept charging currents up to two or three times their discharge rate (2 C, 3 C). Consequently, after an hour of discharge at their full rated output, they offer the potential for a UPS to recover to its original charge state within only thirty minutes or even twenty minutes.

Unfortunately, to construct a UPS having the conventional architecture which can exploit the potential for speedy recovery using modern battery technologies requires a significant increase in the power rating and therefore the cost, of the converter circuits, particularly switches within the input converter 110. If one designates the nominal power consumption of the load to be Pn, and if one specifies that the UPS should operate for a time with an overload condition of 1.5 Pn being consumed by the load, one can calculate that output converter 112 requires a power rating of 1.5 Pn. If one allows full nominal load Pn but not overload condition in discharge mode, then DC-DC converter 114 requires a capacity of Pn. Input converter 110 requires a rating of 1.5 Pn (to cover the overload condition), plus whatever is the maximum charging rate of the battery. Even ignoring the potential to recharge the battery at 2 C or 3 C rates, if one allows the battery to charge at a rate C equal to its full discharge rate, the total capacity required in input converter 110 becomes 2.5 Pn and the total capacity of the three converters in the UPS system becomes 3.5 Pn. The high nominal power of these circuits directly impacts the cost of them, particularly in the case of the input converter 110.

Figure 2:
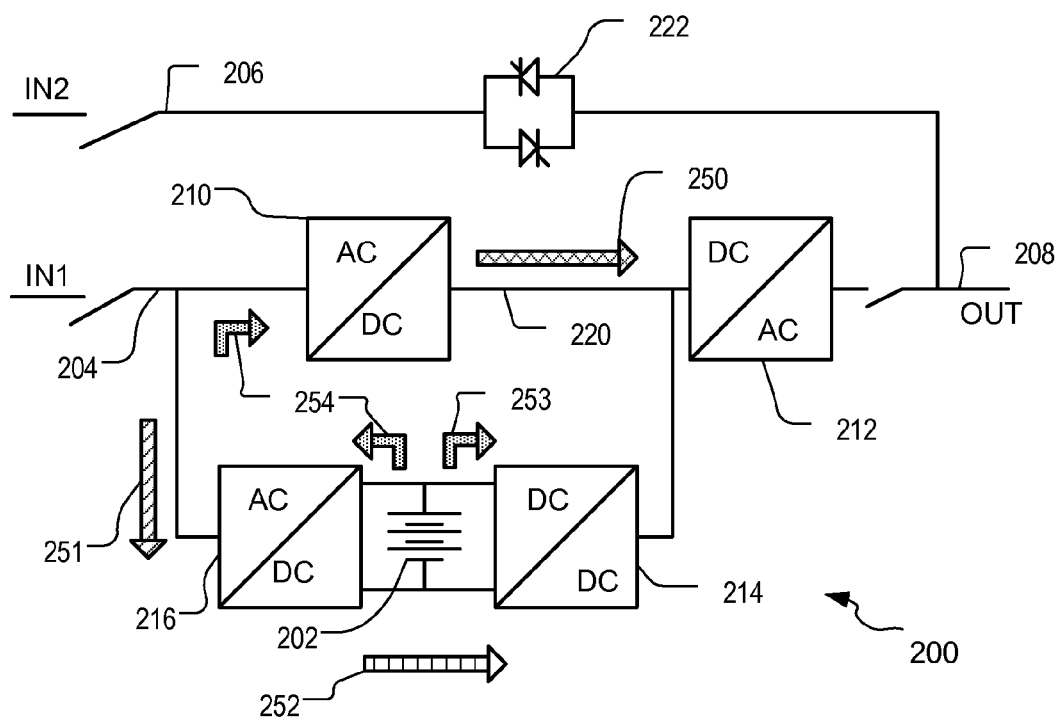
FIG. 2 is a schematic block diagram of a UPS having reduced recovery time, according to a first embodiment of the present invention.

FIG. 2 shows a new architecture of UPS according to a first embodiment of the invention. In this architecture, the rapid recovery is provided by exploiting the higher charging rate of a modern battery, without a corresponding increase in the power handling requirements of the input converter.

In FIG. 2, components having similar functions to those in FIG. 1 have similar reference signs, but with prefix '2' instead of T. Thus we see UPS 200 comprises battery 202, first and second supply inputs 204, 206, output 208, an input converter 210, an output converter (inverter) 212, DC-DC converter 214 and DC bus 220. In addition, however, a second AC-DC converter 216 is provided between input 204 and battery 202. Describing the operation of the new architecture UPS in the same functional modes as before, the operation of the UPS is as follows. Different variations within the architecture of FIG. 2, and variant architectures within the scope of the invention are also possible, as will be described further below.

Again, the UPS 200 has several modes of operation. In normal operation, power for a load connected to output 208 is derived from the first supply input 204 via converter 210, DC bus 220 and inverter 212 (indicated by arrow 250). At the same time, charging current for recharging the battery can be supplied (arrow 251) via the further converter 216, without passing through any of converter 210, DC bus 220 or DC-DC converter 214. In overload conditions, if desired, the power reaching inverter 212 via converter 210 can be supplemented with power flowing along a parallel path from supply 204 via converter 216 and DC-DC converter 214 (arrows 250 251 and 252) to the input of converter 212. In principle, one could also release energy from the battery to supplement the main supply in case of overload. To provide such a facility is a design choice. Where it is provided, it may be activated selectively in dependence on the duration of the overload and the state of charge of the battery.

For discharge operation, again two parallel paths are provided for current to leave battery 202 to supply the load at output 208. As in a conventional architecture, a first path 263 is via DC-DC converter 214 to DC bus 220. A second path 254 is through converter 216, which is bidirectional in this implementation. DC power from battery 202 is converted to AC and fed to the input 204, where it is converted to DC by input converter 210.

Considering now the required power capacities of the various circuits within UPS 200, the provision of the parallel paths just mentioned allows a substantial reduction in the maximum rating of various circuits, especially input converter 210. Consider again a nominal load power rating of Pn, a potential overload condition of 1.5 Pn, and a battery charging power during normal operation of up to Pn. The above described modes can all be satisfied using a PFC converter 210 with rating Pn, a further converter 216 with rating Pn, which is bi-directional, and DC-DC converter 214 with capacity Pn/2. Total capacity of these three circuits is therefore 2.5 Pn instead of 3.5 Pn, and none of the circuits requires to be rated above Pn. DC-DC converter 214 requires a rating of only half Pn, and can be of simplified design as it is unidirectional in operation. At another time, during normal operation when recovering after a period of discharge, the same UPS circuit can supply a full charging current with Pn rating to the battery.

In an alternative implementation, DC-DC converter 214 could have the full rating of at least Pn (1.5 Pn to cover overload situations), and converter 216 need only be unidirectional. Note that charging with a power Pn implies that recovery to full charge should take a time comparable to the period of discharge, under full load.

Figure 3:
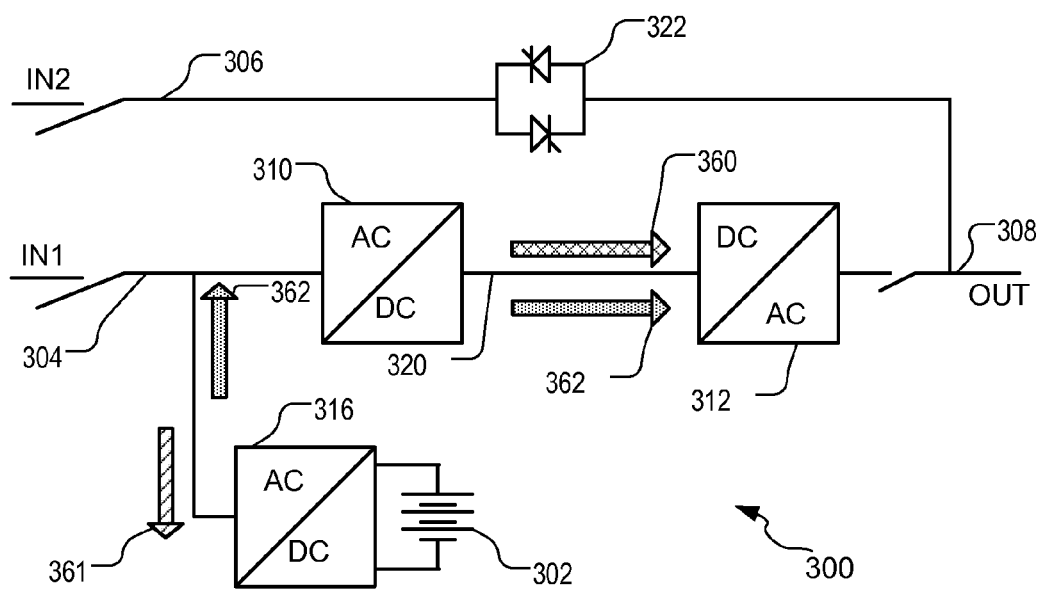
FIG. 3 is a schematic block diagram of a UPS having reduced recovery time according to a second embodiment of the present invention.

FIG. 3 shows another variant of the new UPS architecture. Again, similar reference signs are used for the various components but with prefix '3'. In this variation, no DC-DC converter (214) is provided between battery 302 and DC bus 320. Rather, only the bidirectional AC-DC converter 316 is provided between battery 302 and input 304. Operation is the same as for the embodiment of FIG. 2 except that all discharge of stored energy from the battery is routed through converter 316 to the input converter 310. In normal operation, power is transferred from input 304, through converters 310 and 312, along the path 360 to the load at output 308. Charging current, if required, is supplied along path 361 from input 304 via converter 316 to battery 302. In discharge mode, power is provided from the battery via path 362, reversing the operation of converter 316 and supplying power from the battery back to the input of converter 310.

Under overload conditions in normal operation, additional power (up to 0.5 Pn, for example) is provided from the supply at input 304. Alternatively, overload power could be provided from the battery via path 362, by reversing the operation of converter 316 and supplying the additional power from the battery back to the input of converter 310 (path 362). Compared with the FIG. 2 embodiment, converter 316 must in this case have bidirectional capability, and the power capacity of converters 310 and 316 is increased to 1.5 Pn. Still, the combined capacity of the converters 310 and 316 is only 2.5 Pn, not 3.5 Pn, as would be required in the architecture of FIG. 1. The DC-DC converter is eliminated.

Figure 4:
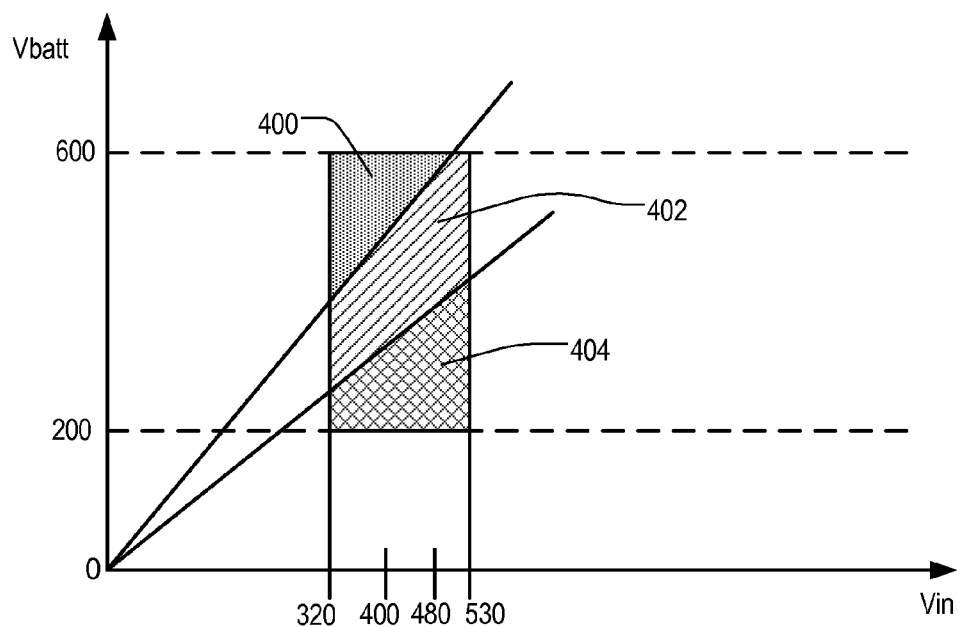
FIG. 4 illustrates different operating ranges in the operation of a converter in the circuit of FIG. 3.

FIG. 4 illustrates different functional modes within converter 216/316 in the new architecture UPS, when charging the battery. The operating mode depends on the relationship between the AC voltage at input 304 represented by Vin and the battery voltage Vbatt. Typical voltages from 320, through 400 and 480 to 530 volts are marked on the horizontal axis, representing the rms (root mean square) value of the mains line-to-line voltage. In the conventional architecture, where charging of battery 102 is performed via a DC bus 120, it can be assured that the voltage on the DC bus is well above the voltage of the battery. Converter 114 has only a single mode of operation when charging the battery, namely that of a simple buck converter. In the new architecture of FIGS. 2 and 3, however, converter 216/316 has both buck and boost modes for AC-DC and DC-AC conversion (i.e. bidirectional), for performing the charging and discharging of the battery under various conditions.

In an upper operating region 400 marked in FIG. 4, the battery voltage is greater than the peak line-to-line voltage of the AC supply, which in this example is assumed to be a three phase supply. Converter 216/316 operates in a three phase boost mode in order to achieve sufficient charging voltage for the battery. In an intermediate region 402, converter 216/316 operates in a single phase boost mode. In a lower region 404, the battery voltage is lower than the peak line-to-neutral voltage of the AC supply, and a three phase buck converter mode is implemented.

Figure 5:
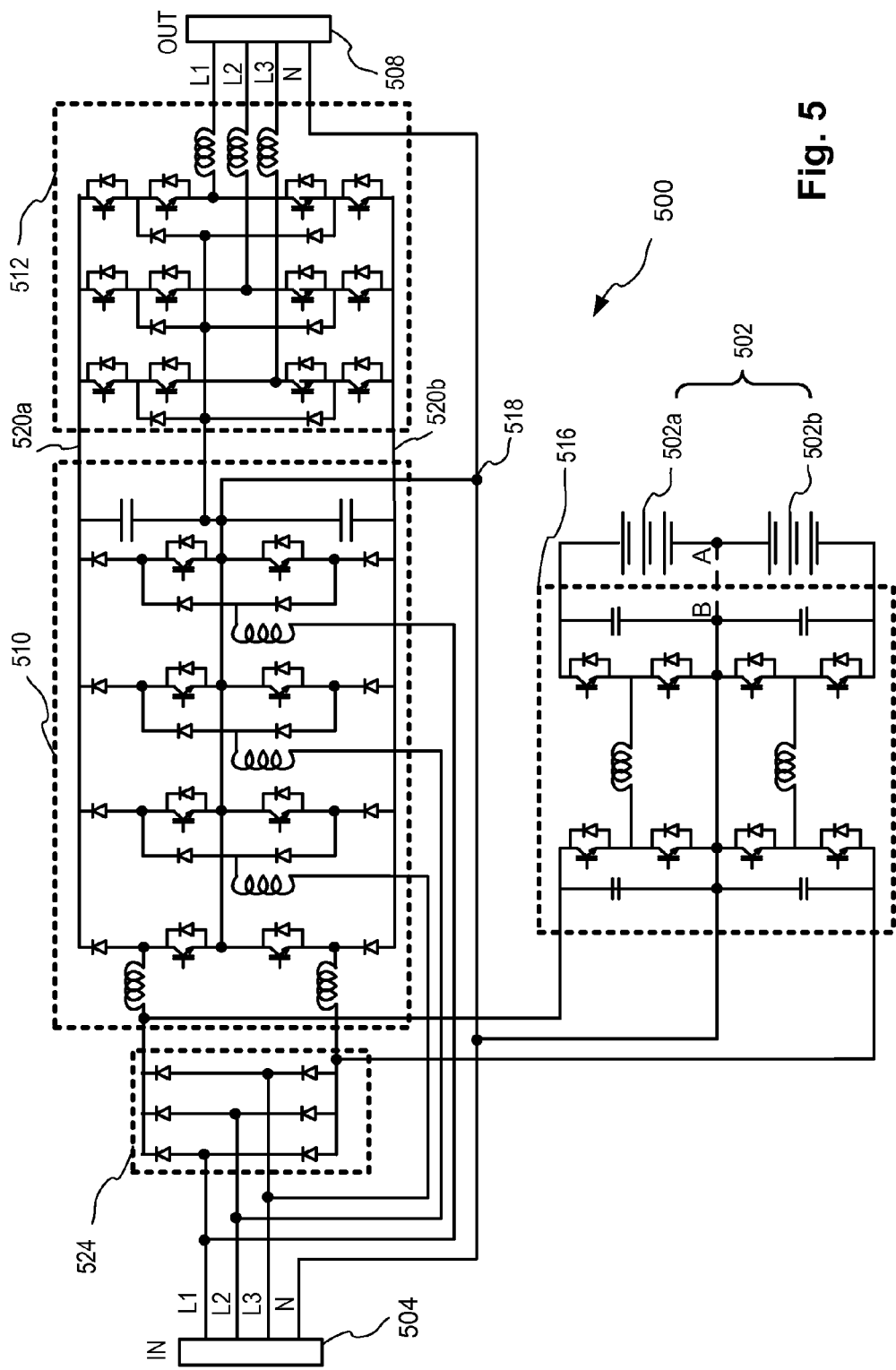
FIG. 5 is a schematic block diagram of a UPS according to a third embodiment of the invention, with internal detail of converter circuits.

FIG. 5 illustrates the internal structure of the components within a UPS 500 representing a third embodiment of the new architecture. Functional blocks having functions similar to those in FIG. 3 are labeled with similar reference numbers, but with prefix '5' rather than '3'. The detail of the three phases wiring and switching is also shown. Thus, at supply input 504 we see three live phase lines labeled L1, L2, L3 and a neutral connection labeled N. At output 508 we see again three live phase lines and a neutral. Neutral N is connected from input to output and also forms a common, neutral bus 518 throughout the UPS circuit blocks input converter 510, inverter 512 and bidirectional converter 516. The detailed implementation and operation of the switching circuits, together with inductors and capacitors inside converters 510 and 512 is familiar to those skilled in the art and will not be described further. It goes without saying that appropriate sequencing of operations of the switches needs to be effected by suitable control circuits and control algorithms, to achieve the functions described.

DC bus 520 in this example comprises positive and negative lines 520a, 520b, plus the neutral line 518, forming a split (three level) DC supply. Similarly, battery 502 is split into an upper half 502a and a lower half 502b. A midpoint node A is floating, but has a nominal voltage equal to the neutral voltage present on node B within converter 516. The nodes A and B can be electrically connected if desired.

It will be seen that in the UPS 500, no separate converter path is provided between battery 502 and DC bus 520. Therefore the architecture has more similarity with that of FIG. 3 than FIG. 2. A difference from the FIG. 3 architecture is that converters 510 and 516 are not completely separate AC-DC converters connected to input 504, but share a common rectifier section 524. Therefore, rather than providing a bidirectional AC-DC/DC-AC function, it is sufficient for converter 516 to provide a bidirectional DC-DC converter function. Rectifier 524 needs to be rated for supplying the power consumed by both converters 510 and 516. However, since the rectifier 524 contains no switching components, this higher capacity does not have the cost implications that were described above in relation to an increased rating in the conventional UPS architecture.

Figure 6:
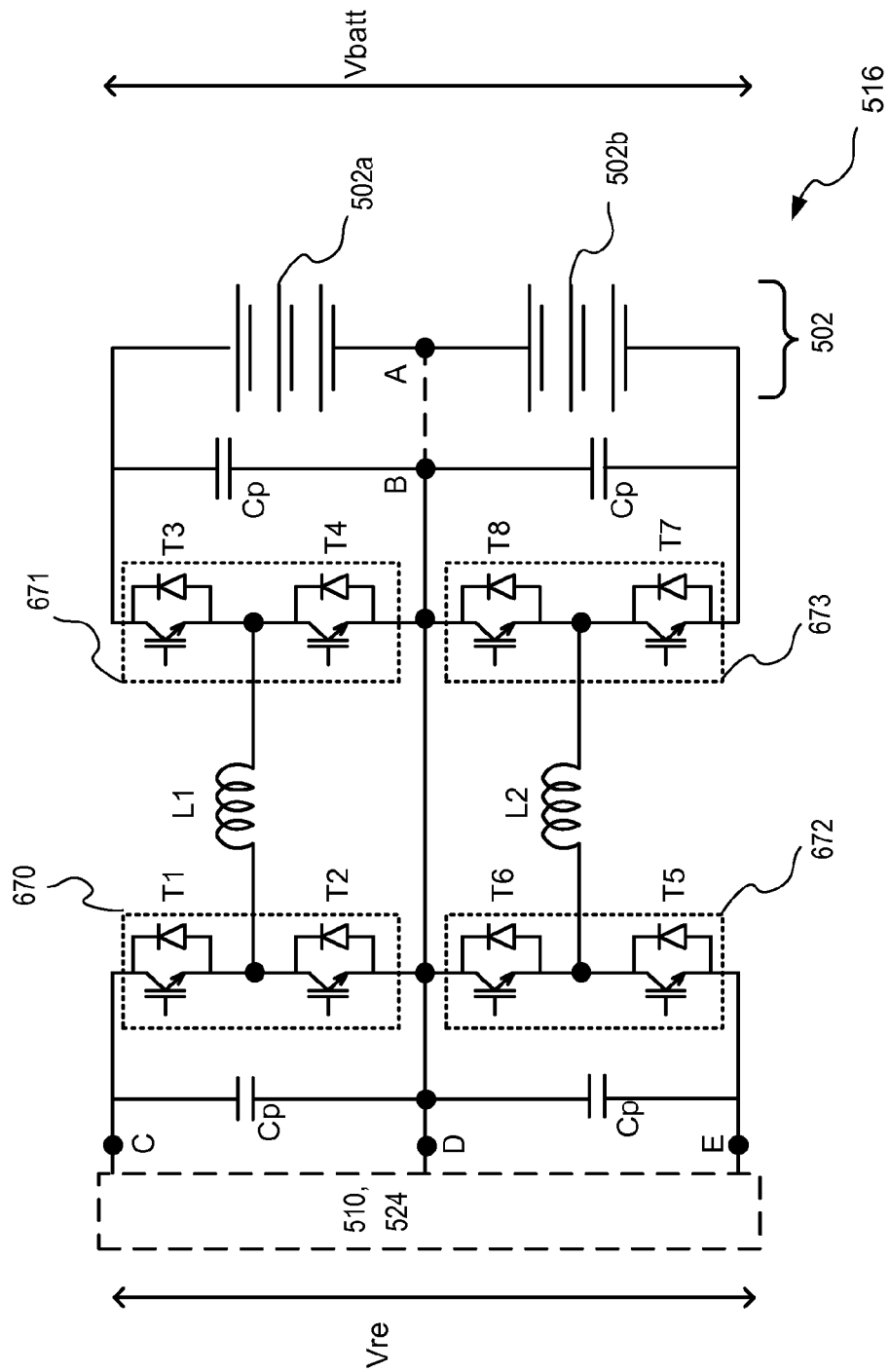
FIG. 6 shows in more detail a bidirectional converter in the circuit of FIG. 5.

FIG. 6 illustrates in more detail, the internal structure of bidirectional converter 516 in one embodiment. Nodes A and B are labeled as in FIG. 5, while nodes connected to rectifier 524 and converter 510 are labeled C (positive line), D (neutral) and E (negative line) as shown. As the converter is bidirectional in capability, either the right hand (battery) side or the left hand side may be considered an input or an output side at different times. The circuit therefore has a symmetrical configuration between the left and right sides. Similarly, upper (positive) and lower (negative) halves of the circuit are symmetrical about the neutral line. Capacitors Cp are provided at each input/output for charge storage, in both positive and negative halves of the circuit. Power can be transferred in either direction between the left and right sides via inductors L1 (positive half) and L2 (negative half). At each end of each inductor, a commutator comprising a complementary pair of switches is provided for connecting the inductor to either side of its half of the input-output supply. These complimentary pairs of switches (commutators) are labeled T1/T2 (670), T3/T4 (671), T5/T6 (672), and T7/T8 (673) as shown. Each switch may be implemented by a semiconductor device, for example an insulated gate bipolar transistor (IGBT). Each switch has a freewheel diode connected in reverse polarity as shown. The principles of operation of these devices are well known.

Compared with a conventional two-level converter, the FIG. 6 converter operates at three levels (positive, neutral and negative). This brings advantages in that each switch (T1, T2 etc) is subjected to a much lower maximum voltage during the various phases of operation, and also the volume of inductance required for filtering is reduced. The three-level topology is chosen for this benefit, but other typologies can be used without departing from the scope of the invention. Operation of the top (positive) half of the circuit will be described, it being understood that the bottom half works similarly.

A first mode of operation in the converter circuit of FIG. 6 is for charging the battery in a case where the supply voltage, in this case output voltage Vre of rectifier 524, is greater than Vbatt. Control of switch T1 is performed at a switching frequency, and the duty cycle of switching is used to regulate a transfer of energy from left to right through inductor L1. Switches T2, T3, T4 are off (open circuit), while their freewheel diodes permit passage of reverse current, if necessary. Current flows through the freewheel diode of switch T3 into the upper capacitor at the output side, and into battery 502a. In this way, a buck conversion function is implemented.

In another case, charging of the battery may be required when the input voltage Vre is less than Vbatt (region 400 or 402 in FIG. 4). A boost function is required. In this situation, switch T1 is permanently on (closed). Switch T4 is operated at the switching frequency to regulate transfer of energy to the battery. Switches T2 and T3 are off (open), although their freewheel diodes can conduct current as necessary.

Operations of the lower half of the circuit are performed in parallel, with the aim that battery halves 502a and 502b are symmetrically charged. Operations in discharge mode, boost and buck, can be obtained by reversing the modes of the left and right commutators.

Figure 7:
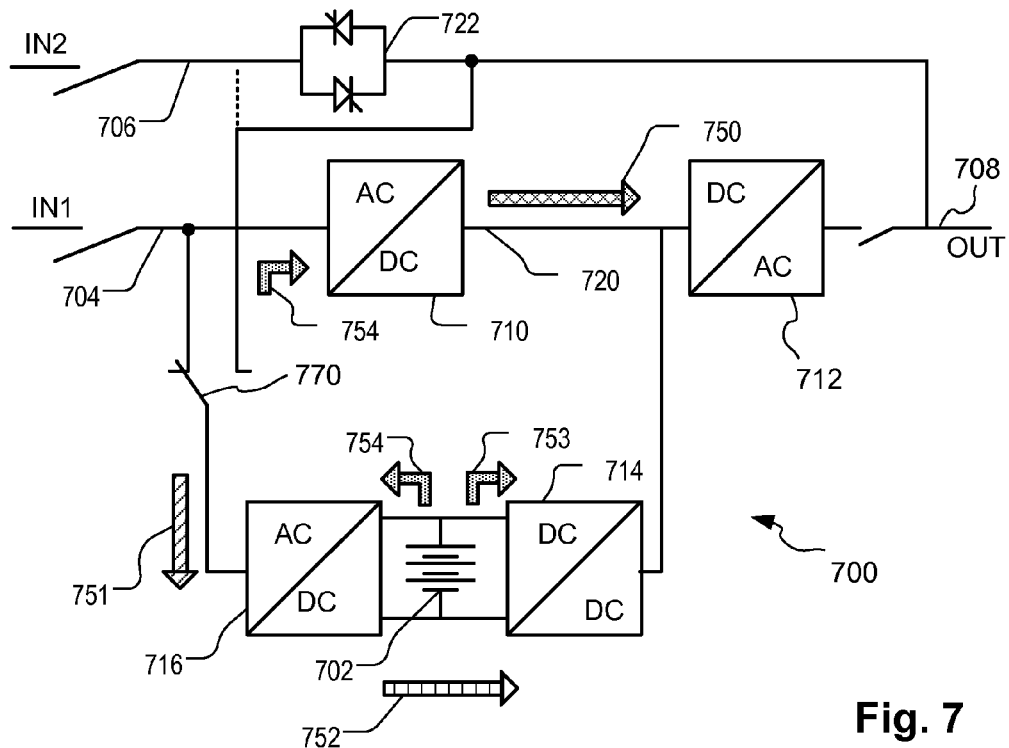
FIG. 7 is a schematic block diagram of a UPS forming a modified version of the embodiment of FIG. 2.
Figure 8:
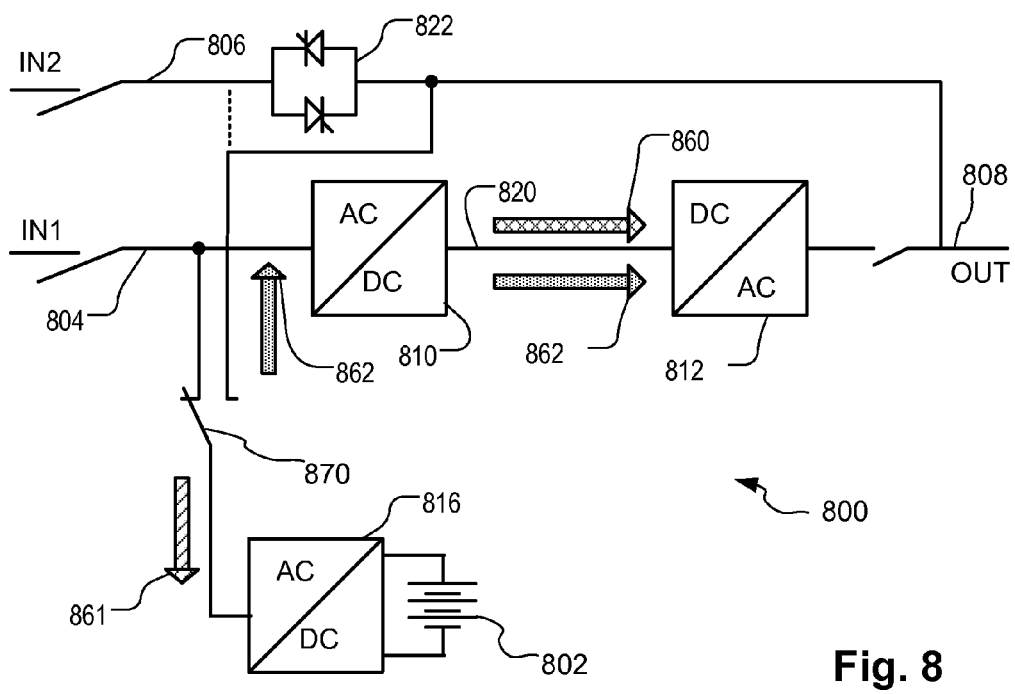
FIG. 8 is a schematic block diagram of a UPS forming a modified version of the embodiment of FIG. 3.

Referring to FIGS. 7 and 8, these show modified versions of the architectures of FIGS. 2 and 3 respectively. In each case, it can be seen that the converter 716/816 can be connected optionally to the first supply input 704/804 or the second supply input 706/806. Switches 770 and 870 are provided to provide this function. The switches are connected, as shown in solid lines, to draw the charging power from the second supply input at a point downstream of solid-state interrupters 722/822, to allow faster switching between supplies. In other embodiments, the switches may be connected directly to the supply input 706/806 (shown in dotted lines). In systems having two independent supplies available, these architectures allow flexibility in the balance of power taken by the system from the first and second supplies. Referring again to the high power demands associated with rapid recovery charging of the battery 702/802, and to overload conditions at the output 708/808, the supply that drives input 704/804 does not need to be over-dimensioned. Nominal power values for the various converters in FIGS. 7 and 8 are the same as those in FIGS. 2 and 3 respectively.

In conclusion, there are disclosed several embodiments of a new architecture of UPS. With proper design, these can provide a number of advantages over conventional architectures, in particular that the batteries can be recharged much more quickly after a discharge event, without a disproportionate increase in the rating and costs of the components required.

Using more advanced battery technologies, the new architecture allows the power across each converter in the UPS to be minimized, while also allowing full autonomy to be recovered within twenty to thirty minutes after a discharge event. The application is not limited to operation with modern types of batteries such as LiFePO4, but can be used to exploit fully the potential of those batteries. Some advantages of the modern batteries include reduced or no risk of thermal runaway, high volumetric energy density, high energy density per unit weight, high discharge ratings, including under continuous, adverse operation, rapid charging and extended cycle lifetime.

It will be appreciated that these examples described above are not the only embodiments possible within the spirit and scope of the invention. Variations are possible both in the functionality of the components and the modes of operation of the UPS as a whole, and in the specific implementation of circuitry within the components. For example, where a converter is described as bidirectional, this can of course be implemented as two unidirectional converters, connected to work in opposite directions. Variations are also possible in the switching sequences and control algorithms applied in the control of those functions.

The invention claimed is:

1. An uninterruptible power supply circuit having a main supply input, connections for a battery, and a supply output, the uninterruptible power supply circuit comprising an input converter and an output converter, said input converter being connected between said main supply input and said output converter, said output converter being connected between an output of said input converter and said supply output, the circuit being operable in (i) a normal operation mode in which power is received at said main supply input and converted by said input converter and output converter in series to provide an output power supply via said supply output to a load, and (ii) a discharge mode wherein stored energy from said battery is released to said load via the output converter to maintain said output power supply to the load in the absence of power at said main supply input, wherein the circuit includes a further converter operable to provide a charging current supply to said battery from a charging supply input, which may be the same as the main supply input or different, said charging current bypassing said input converter, and wherein said further converter is a bidirectional converter and is operable in said discharge mode to deliver at least a portion of said released energy to the output converter indirectly, via said input converter.

2. An uninterruptible power supply circuit as claimed in claim 1 wherein said uninterruptible power supply circuit further includes a second further converter connected between the battery connections and the output converter, said second further converter being operable in said discharge mode to transfer a further portion of said released energy from the battery directly to the output converter.

3. An uninterruptible power supply circuit as claimed in claim 2 wherein said second further converter is further operable in a high load mode to supply power to said output converter in parallel with power supplied by said input converter, such that power to the load can exceed a power rating of the input converter.

4. An uninterruptible power supply circuit as claimed in claim 3 wherein a power rating of said second further converter is less than a power rating of the uninterruptible power supply circuit with regard to the load.

5. An uninterruptible power supply circuit as claimed in claim 2 wherein said second further converter is unidirectional.

6. An uninterruptible power supply circuit as claimed in claim 1 wherein said uninterruptible power supply circuit further includes a second further converter connected between the battery connections and the output converter, said second further converter being operable in said discharge mode to transfer released energy from the battery directly to the output converter.

7. An uninterruptible power supply circuit as claimed in claim 1 wherein said main supply input is an AC supply input, wherein said input converter is preceded by a rectifier stage, and wherein said further converter is arranged to draw said charging power from said charging supply input via the same rectifier stage.

8. An uninterruptible power supply circuit as claimed in claim 7 wherein said further converter is operable in said discharge mode to deliver the at least a portion of said released energy to the output converter indirectly, via said input converter, bypassing said rectifier stage.

9. An uninterruptible power supply circuit as claimed in claim 1 including at least two separate supply inputs, and wherein said further converter is operable to use one of said supply inputs as said main supply input while using another of said supply inputs as said charging supply input.

10. An uninterruptible power supply circuit as claimed in claim 1 including a battery connected to the battery connections.

11. An uninterruptible power supply circuit as claimed in claim 1, wherein the uninterruptible power supply circuit is connected by its main supply input and charging supply input to one or more power supplies, and connected by its supply output to a load.

12. A method of providing an uninterruptible power supply between a main supply input, a battery and a load, the method comprising the steps:
   (a) providing an input converter and an output converter, said input converter being connected between said main supply input and said output converter, said output converter being connected between an output of said input converter and said load;
   (b) in a first mode of operation in which power is received at said main supply input, converting power by said input converter and output converter in series to provide an output power supply via said supply output to a load;
   (c) in a second mode of operation in which power at said main supply input is absent or unreliable, releasing stored energy from said battery via the output converter to maintain said output power supply to the load; and
   (d) using a further converter during said first mode of operation to provide a charging current supply to said battery from a charging supply input, which may be the same as the main supply input or different, said charging current bypassing said input converter,
   wherein said further converter is a bidirectional converter and is used in step (c) to deliver at least a portion of said released energy to the output converter indirectly, via said input converter.

13. A method as claimed in claim 12 wherein a second further converter connected between the battery and the output converter is used in step (c) to transfer a further portion of said released energy from the battery directly to the output converter.

14. A method as claimed in claim 13 wherein said further converter and second further converter are used in said first mode to supply power to said output converter in parallel with power supplied by said input converter, such that a total power supplied to the load exceeds a power rating of the input converter.

15. A method as claimed in claim 12 wherein a second further converter connected between the battery connections and the output converter is used in said step (c) to transfer released energy from the battery directly to the output converter.

16. A method as claimed in claim 12 wherein said main supply input is an AC supply input, wherein said input converter is preceded by a rectifier stage, and wherein in step (d) said further converter draws said charging power from said charging supply input via the same rectifier stage.

17. A method as claimed in claim 16 wherein said further converter is further used in step (c) to deliver the at least a portion of said released energy to the output converter indirectly, via said input converter, bypassing said rectifier stage.

18. A method as claimed in claim 12 wherein said main supply input and said charging supply input are separate supply inputs.

* * * * *